United States Patent
Sibik (10) Patent No.: US 10,612,827 B2
(45) Date of Patent: Apr. 7, 2020

(54) CHILLER CAPACITY CONTROL APPARATUSES, METHODS, AND SYSTEMS

(71) Applicant: Trane International Inc., Piscataway, NJ (US)

(72) Inventor: Lee L. Sibik, Onalaska, WI (US)

(73) Assignee: Trane International Inc., Davidson, NC (US)

( * ) Notice: Subject to any disclaimer, the term of this patent is extended or adjusted under 35 U.S.C. 154(b) by 807 days.

(21) Appl. No.: 14/725,223

(22) Filed: May 29, 2015

(65) Prior Publication Data
US 2015/0260441 A1 Sep. 17, 2015

Related U.S. Application Data

(63) Continuation of application No. PCT/US2013/072112, filed on Nov. 26, 2013.
(Continued)

(51) Int. Cl.
*F25B 49/02* (2006.01)
*F24F 11/83* (2018.01)
(Continued)

(52) U.S. Cl.
CPC ........ *F25B 49/022* (2013.01); *F04D 27/0246* (2013.01); *F04D 27/0261* (2013.01);
(Continued)

(58) Field of Classification Search
CPC ...... F25B 2339/047; F25B 2700/21161; F25B 49/022; F04D 27/0246; F04D 27/0261
See application file for complete search history.

(56) References Cited

U.S. PATENT DOCUMENTS

| | | | |
|---|---|---|---|
| 4,151,725 A | 5/1979 | Kountz et al. | |
| 4,259,845 A | * 4/1981 | Norbeck | F25B 49/025 318/806 |

(Continued)

FOREIGN PATENT DOCUMENTS

| | | |
|---|---|---|
| CN | 1910347 A | 2/2007 |
| CN | 102165273 A | 8/2011 |

(Continued)

OTHER PUBLICATIONS

International Search Report, PCT/US2013/072112, dated Apr. 21, 2014.

(Continued)

*Primary Examiner* — Nelson J Nieves
(74) *Attorney, Agent, or Firm* — Taft Stettinius & Hollister LLP (57) ABSTRACT

Controls for chillers with variable speed and variable geometry compressors are disclosed. In exemplary embodiments, a centrifugal compressor equipped with a variable frequency drive and variable inlet guide vanes may be utilized. A controller is operable to determine a chiller capacity command, a speed command, and a vane position command. The speed command and vane position command may maintain system operation at or near a surge control boundary over one or more capacity ranges to enhance efficiency and deviate from the surge control boundary over certain capacity ranges to improve controllability or avoid control aberrations.

16 Claims, 8 Drawing Sheets

Related U.S. Application Data (60) Provisional application No. 61/733,215, filed on Dec. 4, 2012.

(51) Int. Cl.
    *F24F 11/30*     (2018.01)
    *F04D 27/02*     (2006.01)
    *F24F 3/06*     (2006.01)
    *F24F 140/20*     (2018.01)
    *F24F 140/50*     (2018.01)
    *F24F 110/00*     (2018.01)

(52) U.S. Cl.
CPC ................ *F24F 3/06* (2013.01); *F24F 11/30* (2018.01); *F24F 11/83* (2018.01); *F24F 2110/00* (2018.01); *F24F 2140/20* (2018.01); *F24F 2140/50* (2018.01); *F25B 2339/047* (2013.01); *F25B 2600/021* (2013.01); *F25B 2600/026* (2013.01); *F25B 2700/197* (2013.01); *F25B 2700/2117* (2013.01); *F25B 2700/21161* (2013.01); *F25B 2700/21162* (2013.01); *F25B 2700/21163* (2013.01); *F25B 2700/21174* (2013.01); *F25B 2700/21175* (2013.01); *Y02B 30/741* (2013.01)

(56) References Cited

U.S. PATENT DOCUMENTS

| | | | | |
|---|---|---|---|---|
| 4,282,718 | A * | 8/1981 | Kountz | F25B 49/022 62/115 |
| 4,282,719 | A * | 8/1981 | Kountz | F25B 49/022 62/115 |
| 4,355,948 | A | 10/1982 | Kountz et al. | |
| 4,589,060 | A | 5/1986 | Zinsmeyer | |
| 4,608,833 | A | 9/1986 | Kountz | |
| 4,646,534 | A | 3/1987 | Russell | |
| 4,686,834 | A | 8/1987 | Haley et al. | |
| 4,689,967 | A | 9/1987 | Han et al. | |
| 5,355,691 | A * | 10/1994 | Sullivan | F04D 27/0261 415/17 |
| 5,537,830 | A * | 7/1996 | Goshaw | F04D 27/0261 62/201 |
| 5,553,997 | A | 9/1996 | Goshaw et al. | |
| 5,947,680 | A | 9/1999 | Harada et al. | |
| 6,202,431 | B1 | 3/2001 | Beaverson et al. | |
| 6,244,058 | B1 | 6/2001 | Duga et al. | |
| 6,434,960 | B1 | 8/2002 | Rousseau | |
| 9,746,228 | B2 | 8/2017 | Sibik | |
| 2002/0173929 | A1 * | 11/2002 | Seigel | F24F 11/0086 702/130 |
| 2005/0160748 | A1 | 7/2005 | Shaffer et al. | |
| 2005/0160750 | A1 | 7/2005 | Shaffer et al. | |
| 2006/0010893 | A1 | 1/2006 | Dominguez | |
| 2009/0024257 | A1 | 1/2009 | Crane et al. | |
| 2010/0024456 | A1 | 2/2010 | Ueda et al. | |
| 2011/0048046 | A1 | 3/2011 | Sommer et al. | |
| 2012/0055184 | A1 | 3/2012 | Ueda | |
| 2012/0259528 | A1 * | 10/2012 | Minto | F01D 17/16 701/100 |

FOREIGN PATENT DOCUMENTS

| | | |
|---|---|---|
| CN | 105102910 A | 11/2015 |
| EP | 0186332 A1 | 7/1986 |
| JP | 2006284058 A | 10/2006 |
| KR | 1020050028922 A | 3/2005 |
| WO | 2014-117013 A1 | 7/2014 |

OTHER PUBLICATIONS

Written Opinion, PCT/US2013/072112, dated Mar. 26, 2014.
Brasz and Tetu, Variable-Speed Centrifugal Chiller Control for Variable Primary Flow (VPF) Applications, 2008, Paper 1922.
China Patent Office issued Second Office Action cited in counterpart Chinese Patent Application No. 201380072122.5 dated Mar. 20, 2016 (8 pages) with English Translation of the same (11 pages).
China Patent Office issued Search Report with English Translation cited in counterpart Chinese Patent Application No. 2014800181999 dated Aug. 16, 2016 (1 page).
China Patent Office issued First Office Action cited in counterpart Chinese Patent Application No. 2014800181999 dated Sep. 13, 2016 (5 pages) with English Translation of the same (7 pages).
China Patent Office issued Second Office Action cited in counterpart Chinese Patent Application No. 2014800181999 dated Apr. 7, 2017 (5 pages) with English Translation of the same (10 pages).
Patent Cooperation Treaty International Search Report cited in counterpart International Patent Application No. PCT/US2014/013039 dated May 22, 2014 (3 pages).
Patent Cooperation Treaty Written Opinion cited in counterpart International Patent Application No. PCT/US2014/013039 dated May 22, 2014 (6 pages).
China Patent Office issued First Office Action and Search Report cited in counterpart Chinese Patent Application No. 201380072122.5 dated Jul. 4, 2016 (9 pages) with English Translation of the same (9 pages).

* cited by examiner

CHILLER CAPACITY CONTROL APPARATUSES, METHODS, AND SYSTEMS

CROSS-REFERENCE TO RELATED APPLICATIONS

The present Patent Cooperation Treaty patent application claims the benefit of U.S. Provisional Patent Application No. 61/733,215, filed on Dec. 4, 2012, which is hereby incorporated by reference in its entirety.

BACKGROUND

Chillers equipped with variable speed and variable geometry compressors, such as centrifugal compressors with variable frequency drives and variable inlet guide vanes, present unique opportunities and challenges with respect to control of chiller capacity and efficiency optimization. For any given chiller capacity there are an infinite number of pairs of compressor speed and geometry that could provide a desired chiller capacity. There are also an infinite number of compressor speed and vane position pairs that result in undesirable compressor surge. In general, compressor efficiency can be maximized by operating the compressor at or near its surge boundary. The inventor has discovered that control techniques which follow conventional wisdom with respect to compressor efficiency presents unexpected controls challenges and may create unexpected controls aberrations. For example, over certain capacity ranges, conventional control techniques may attempt to reduce chiller capacity, but instead increase it and vice versa. Control limit cycles may also be encountered. The capacity control techniques disclosed herein provide unexpected benefits with respect to controls and efficiency. The demand for ever increasing levels of efficiency and reliability creates a significant need for the unique and inventive chiller capacity control apparatuses, systems and methods disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

SUMMARY

Unique controls for chillers with variable speed and variable geometry compressors are disclosed. Certain exemplary embodiments utilize a centrifugal compressor equipped with a variable frequency drive and variable inlet guide vanes. Certain exemplary controls are configured to determine a chiller capacity command, a speed command, and a vane position command. The speed command and vane position command may maintain system operation at or near a surge control boundary over one or more capacity ranges to enhance efficiency and deviate from the surge control boundary over certain capacity ranges to improve controllability or avoid controls aberrations. Further embodiments, forms, objects, features, advantages, aspects, and benefits shall become apparent from the following description and figures.

BRIEF DESCRIPTION OF THE FIGURES

The description herein makes reference to the accompanying figures wherein like reference numerals refer to like parts throughout the several views, and wherein.

DETAILED DESCRIPTION OF REPRESENTATIVE EMBODIMENTS

Figure 1:
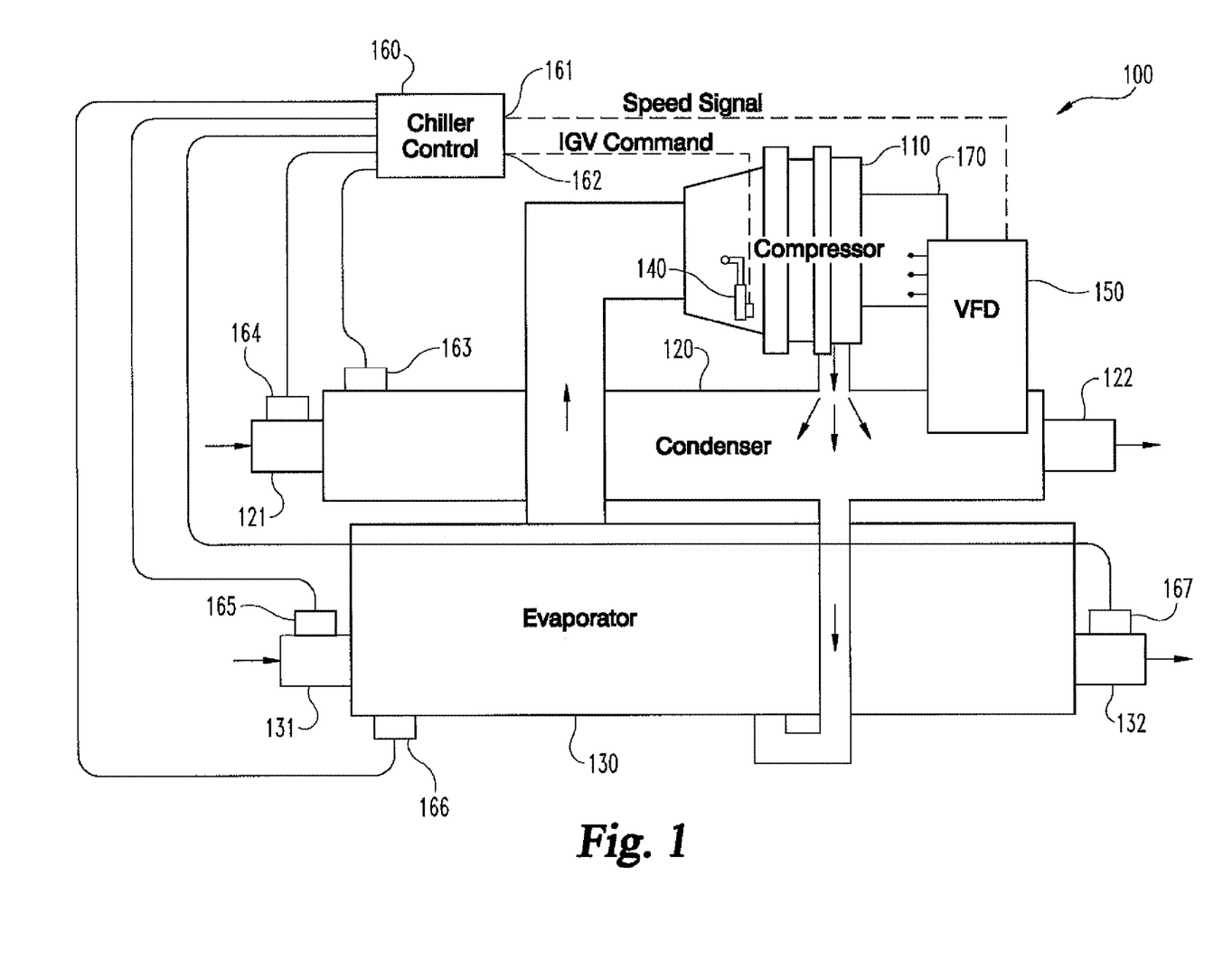
FIG. 1 is a schematic of an exemplary chiller system.

With reference to FIG. 1 there is illustrated a chiller system 100 which includes a refrigerant loop comprising a centrifugal compressor 110, a condenser 120, an evaporator 130 and variable geometry inlet guide vanes 140. Refrigerant flows through system 100 in a closed loop from compressor 110 to condenser 120 to evaporator 130 and back to compressor 110.

Compressor 110 is driven by an electric motor 170 which is in turn driven by a variable frequency drive 150. In the illustrated embodiment, variable frequency drive 150 is configured to output a three-phase PWM drive signal, and motor 170 is a permanent magnet motor. Use of other types and configurations of variable frequency drives and electric motors is also contemplated. Additionally, other types of variable speed compressors could be used, for example, systems where variable compressor speed is provided using a transmission or other gearing, or by varying the pressure across a drive turbine.

Condenser 120 is configured to transfer heat from compressed refrigerant received from compressor 110. In the illustrated embodiment condenser 120 is a water cooled condenser which receives cooling water at an inlet 121, transfers heat from the refrigerant to the cooling water, and outputs cooling water at an output 122. It is also contemplated that other types of condensers may be utilized, for example, air cooled condensers or evaporative condensers.

Evaporator 130 is configured to expand refrigerant to decrease its temperature and transfer heat from a cooled medium to the cooled refrigerant. In the illustrated embodiment evaporator 130 is configured as a water chiller which receives water provided to an inlet 131, transfers heat from the water to refrigerant, and outputs chilled water at an outlet 132. Other types of evaporators and chiller systems are also contemplated, including dry expansion evaporators, flooded type evaporators, bare tube evaporators, plate surface evaporators, and finned evaporators among others. It shall further be appreciated that references herein to water include water solutions unless otherwise explicitly limited.

Chiller system 100 further includes a controller 160 which outputs a speed control signal at output 161. The speed control signal is received by variable frequency drive 150 and is effective to vary the speed at which the variable frequency drive 150 operates electric motor 170 to drive compressor 110. Controller 160 also outputs an inlet guide vane position control signal at output 162. The inlet guide vane signal is received by an inlet guide vane actuator which controls the position of inlet guide vanes 140.

Controller 160 receives input from a plurality of sensors. Sensor 163 outputs a signal to controller 160 indicating condenser refrigerant pressure. Sensor 164 outputs a signal to controller 160 indicating condenser entering water pressure. Sensor 165 outputs a signal to controller 160 indicating evaporator entering water temperature. Sensor 166 outputs a signal to controller 160 indicating evaporator refrigerant temperature or pressure. Refrigerant conditions in the evaporator are saturated thus sensor 166 could be either a temperature or pressure transducer. Conversion from pressure to temperature or temperature to pressure is accomplished by applying the appropriate refrigerant property conversion. Sensor 167 outputs a signal to controller 160 indicating evaporator leaving water temperature. Controller 160 is configured to process the inputs received from the plurality of sensors according to a control routine and output compressor speed control signal 161 and inlet guide vane position command 162. It shall be appreciated that the controls, control routines, and control modules described herein may be implemented using hardware, software, firmware and various combinations thereof and may utilize executable instructions stored in a non-transitory computer readable medium or multiple non-transitory computer readable media.

Figure 2:
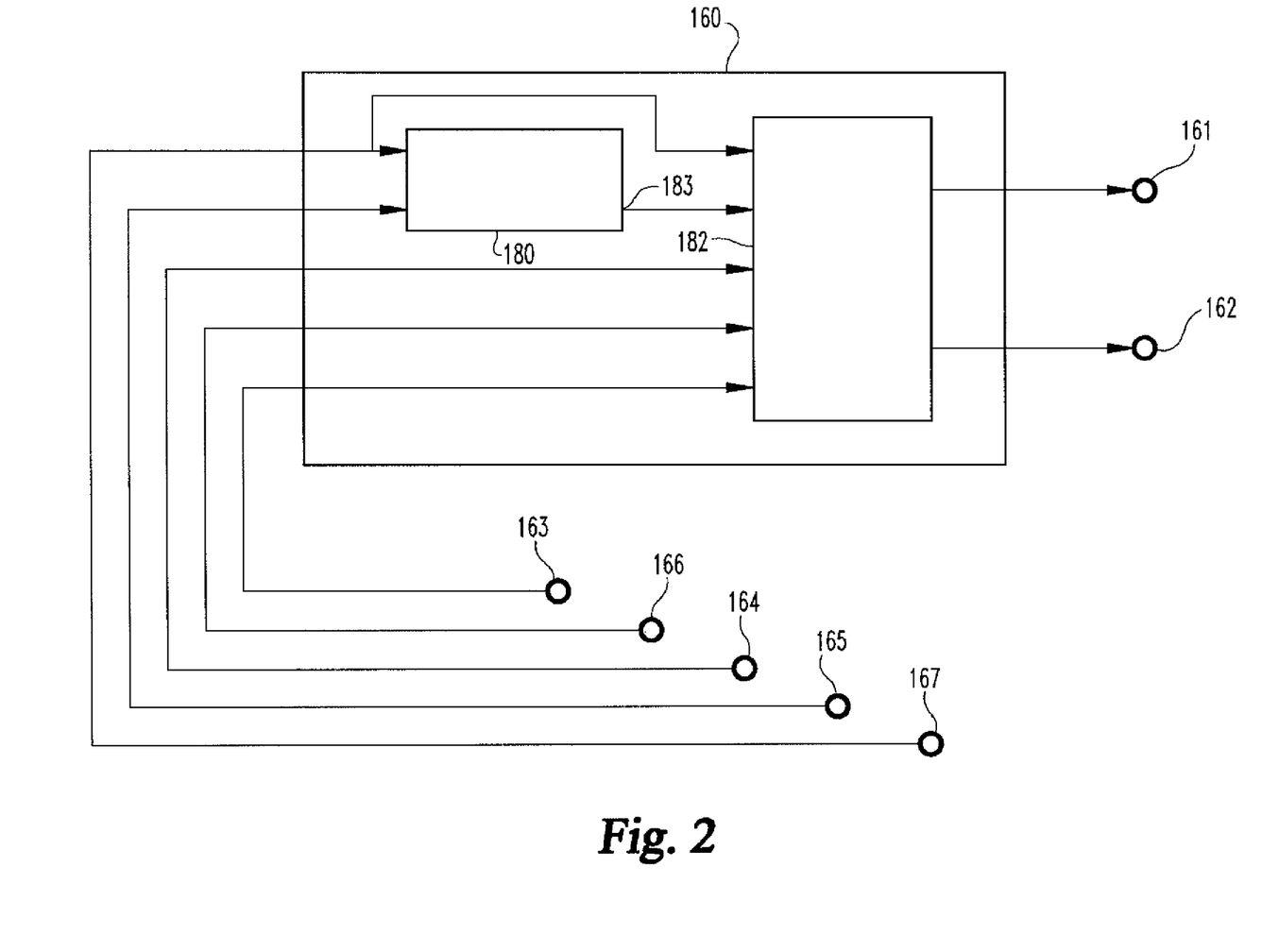
FIG. 2 is a schematic of an exemplary chiller control system.

With reference to FIG. 2 there is illustrated a more detailed view of controller 160 illustrating a capacity control module 180 and a multi-actuator control module 182. Capacity control module 180 receives evaporator entering water temperature information from sensor 165 and evaporator leaving water temperature information from sensor 167. Capacity control module 180 processes these inputs and outputs a capacity command 183 to multi-actuator control module 182. Capacity control module 180 may perform these operations utilizing the techniques and principles described in further detail below. It is also contemplated that alternate or additional control inputs may be utilized to generate a chiller capacity control command.

Multi-actuator control module 182 receives condenser refrigerant pressure information from sensor 163, evaporator refrigerant temperature or pressure information from sensor 166, condenser entering water temperature information from sensor 164, and evaporator leaving water temperature 167, in addition to the capacity control command 183 received from capacity control module 180. Multi-actuator control module 182 processes these inputs and outputs a compressor speed control signal at output 161 and an inlet guide vane position control signal at output 162. Multi-actuator control module 182 may perform these operations utilizing the techniques and principles described in further detail below. It is also contemplated that alternate or additional control inputs may be utilized to generate compressor speed and geometry control signals.

The capacity command 183 output by capacity control module 180 comprises a plurality of compressor speed and inlet guide vane position pairs that can generate a desired capacity at given head conditions. In an exemplary form, capacity control module 180 determines these pairs based upon an empirically derived relationship. Dynamic testing may be performed to determine capacity to actuator relationships at fixed head conditions which are defined as constant lift for control purposes (i.e., entering condenser water temperature minus leaving evaporator water temperature). Compressor speed may be varied from maximum speed to surge and back to maximum speed for a plurality of fixed inlet guide vane positions. The load on the loop may be adjusted to compensate for changing coolant capacity. This testing can be repeated for a plurality of inlet guide vane positions and head conditions. Based upon these tests, a relationship between compressor speed and capacity may be defined according to Equation 1:

$$\text{Speed} = a \times \text{Tons}^2 + b \quad (1)$$

Solving for a and b in equation 1 may be performed by setting capacity to zero and speed to maximum. At zero tons all of the capacity versus speed curves for various inlet guide vane positions converge to a single value that can be defined as $N_0$. This convergence point will vary with lift as defined by Equation 2:

$$b = N_0 = f_b(\text{Lift}) \quad (2)$$

Lift can be defined as the difference between entering condenser water temperature and leaving evaporator water temperature, or as the difference in saturated refrigerant temperature between the evaporator and the condenser. The choice may depend upon which definition is more consistent between various chiller sizes.

Setting Speed to max and solving for coefficient a gives Equation 3:

$$a = (N_{max} - N_0)/\text{Tons}^2 = (N_{max} - N_0)/(f_a(\text{IGV})^2 \times \text{Max-Tons}^2) \quad (3)$$

Capacity ratio (C) and Compressor Speed ratio (Ns) can be defined according to Equations 4 and 5:

$$C = \text{Tons}/\text{MaxTons} \quad (4)$$

$$Ns = (\text{Speed} - N_0)/(N_{max} - N_0) \quad (5)$$

The function $f_a(\text{IGV})$ is the linearization curve for converting capacity command to IGV position. The conversion may be the same as that utilized for fixed speed chiller compressors. It should be appreciated that fixed speed controls may be modeled as a specialized case of variable speed control running at maximum speed. Combining equations 1-5 simplifies the multidimensional problem to the relationship shown in Equation 6 which provides an exemplary model for the relationship between capacity and compressor speed it) and inlet guide vane position:

$$N_s = C^2/f_a(\text{IGV})^2 \quad (6)$$

Because the capacity model described above has an infinite number of solutions, an additional constraint is utilized to provide a unique solution. Data analysis has shown the optimum efficiency for a centrifugal chiller is at or near the surge boundary. The surge boundary may be defined by the pressure coefficient (Pc). The pressure coefficient is a non-dimensional performance parameter useful in defining compressor operation and providing dynamic measurement of the compressor. It represents the relationship between the static pressure and the kinetic energy of the compressor. It is an exemplary parameter that can be utilized in determining a compressor surge potential at given operating conditions. The higher the pressure coefficient, the greater the potential for surge. Chiller efficiency generally increases as the pressure coefficient approaches surge as described by Equation 7:

$$g_c = 32.2 \text{ ft/sec/sec} \qquad (7)$$

$$PC = \frac{144 \times 778 \times g_c}{\pi^2 \times \text{stages} \times d^2 \times N^2} \times$$

$$\left[ Cp \times \left[ \left( \frac{Pcond}{Pevap} \right)^{\frac{\gamma-1}{\gamma}} - 1 \right] \times (Tevap + 460 \text{ deg}) \right]$$

Where $PCond$ = measured condenser pressure ($psia$)

$Pevap$ = saturated evaporator pressure ($psia$)

$Tevap$ = saturated evaporator temperature ($deg$ F.)

$Cp$ = specific heat of the refrigerant (BTU)/$lbm$/$deg$ F.

$\gamma$ = ratio of specific heats stages = number of compressor stages $d$ = mean diameter of the compressor stages (in)

$N$ = compressor speed (Hz)

$g_c$ = 32.2 ft/sec/sec

Equation 7 can be simplified by the following definition of $K_H$.

$$K_H = \text{delta } H \times \frac{144 \times 778 \times 32.2}{\pi^2 \times \text{stages} \times d^2}$$

The pressure coefficient Pc is then modeled by Equation 8:

$$P_c = K_H/N^2 \qquad (8)$$

Using the model above for a given set of operating conditions, the pressure coefficient can be set to a surge control boundary by adjusting compressor speed and/or inlet guide vane position.

Figure 3:
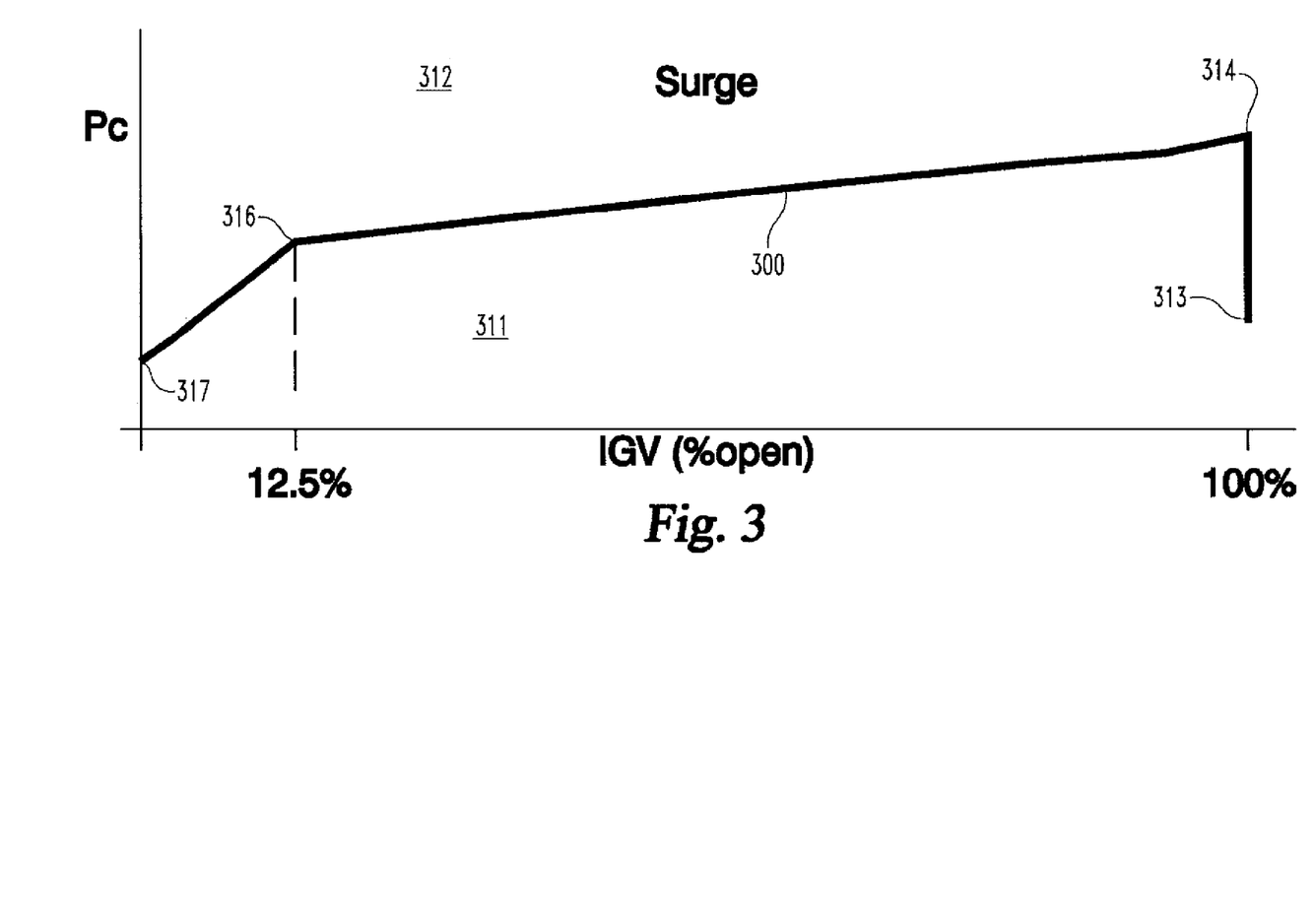
FIG. 3 is a graph of compressor pressure coefficient versus percent inlet guide vane opening illustrating a surge control boundary.

With reference to FIG. 3 there is illustrated a graph of pressure coefficient (Pc) versus inlet guide vane (IGV) position as a percentage of maximum open position. A surge control boundary 300 may be defined as the limit on the pressure coefficient for various inlet guide vane positions effective to avoid or limit the probability of compressor surge to a desired degree. The region 312 above surge control boundary 300 is a region where the compressor will surge or has a high probability of surge. The region 311 below surge control boundary 300 is a region where the compressor will not surge or has a low probability of surge. It shall be appreciated that the surge control boundary 300 may be defined with various margins of error ranging from a set of exact surge points to a set of offset points providing a margin of error. It shall further be appreciated that the surge control boundary 300 may be determined by system characteristics based upon empirical data about system performance and may be predefined or dynamically determined during system operation, for example by using a surge sensor, in order to account for variation in system characteristics.

FIG. 3 further illustrates the variation in surge control boundary 300 relative to both inlet guide vane position and compressor speed. At point 313 compressor speed and inlet guide vane position is maximum. From point 313 surge control boundary 300 proceeds vertically to point 314. Between points 313 and 314 compressor speed decreases and inlet guide vane position is maintained at maximum. From point 314 to point 316, the surge control boundary 300 proceeds at a first slope over which inlet guide vane position decreases and compressor speed also varies. From point 316 to point 317, surge control boundary 300 proceeds at a second slope over which inlet guide vane position and compressor speed also vary. These relationships are further illustrated in a alternate space in FIG. 4.

Figure 4:
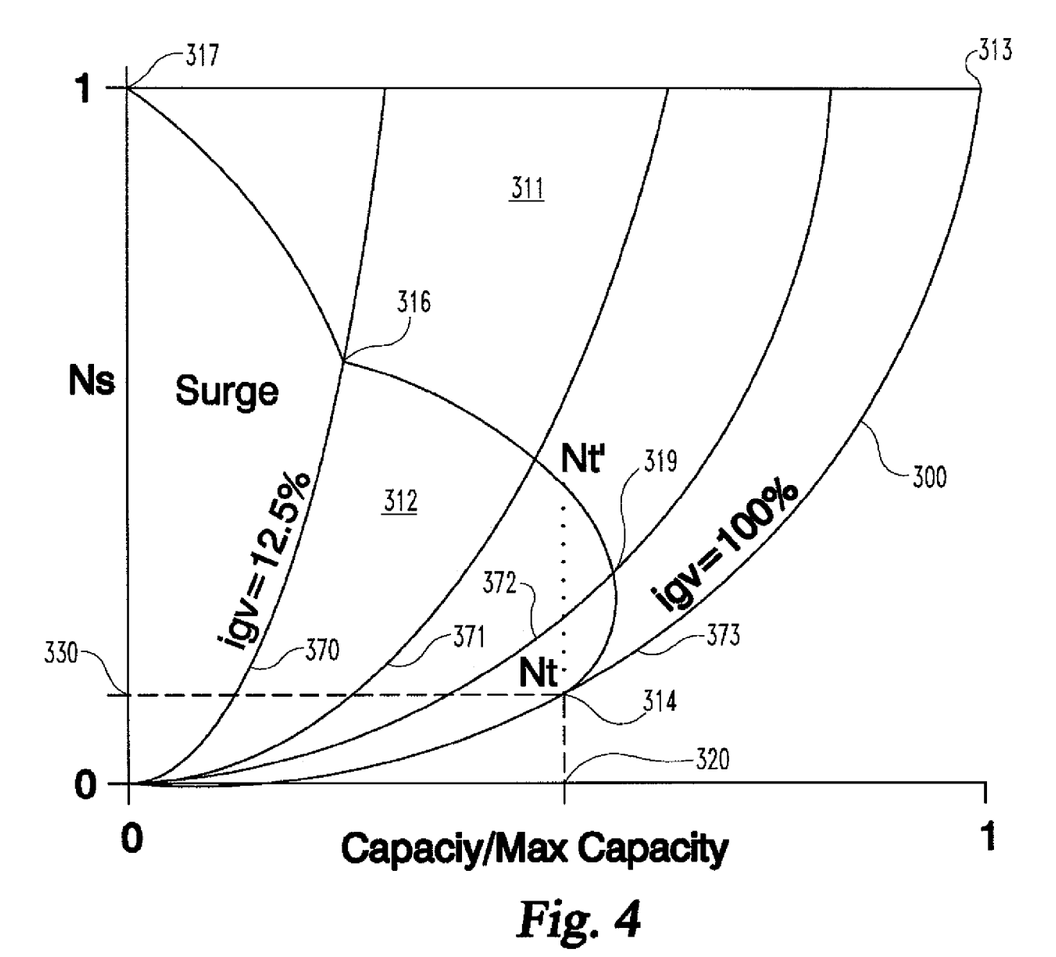
FIG. 4 is a graph of compressor speed versus the ratio of chiller capacity to maximum chiller capacity illustrating the surge control boundary.

With reference to FIG. 4 there is illustrated a graph of compressor speed versus chiller capacity ratio (the ratio of chiller capacity to maximum chiller capacity). FIG. 4 also illustrates surge control boundary 300 and points 313, 314, 316, and 317 are identified for cross reference with FIG. 3. Similarly, regions 311 and 312 are also noted. FIG. 4 also illustrates a plurality of inlet guide vane position curves 370, 371, 372 and 373. At inlet guide vane curve 370, inlet guide vane is at 12.5 percent of its maximum open position. At inlet guide vane curve 373, inlet guide vane position is 100 percent of its maximum open position. At inlet guide vane curves 371 and 372 the inlet guide vanes are at intermediate positions. It shall be understood that inlet guide vane position curves exist for a plurality of additional positions and are not shown for clarity of illustration.

With continuing reference to FIG. 4, point 314 defines a capacity value 320 and a speed value 330 at which surge boundary 300 transitions from fully open inlet guide vane position to progressively variable inlet guide vane position. Point 319 is an inflection point at which the relationship between compressor speed and capacity is inverted. Consequently, when following the surge control boundary 300, from point 314 to point 319 the system control according to curve 300 will attempt to decrease compressor capacity but would actually increase and vice versa.

Figure 5:
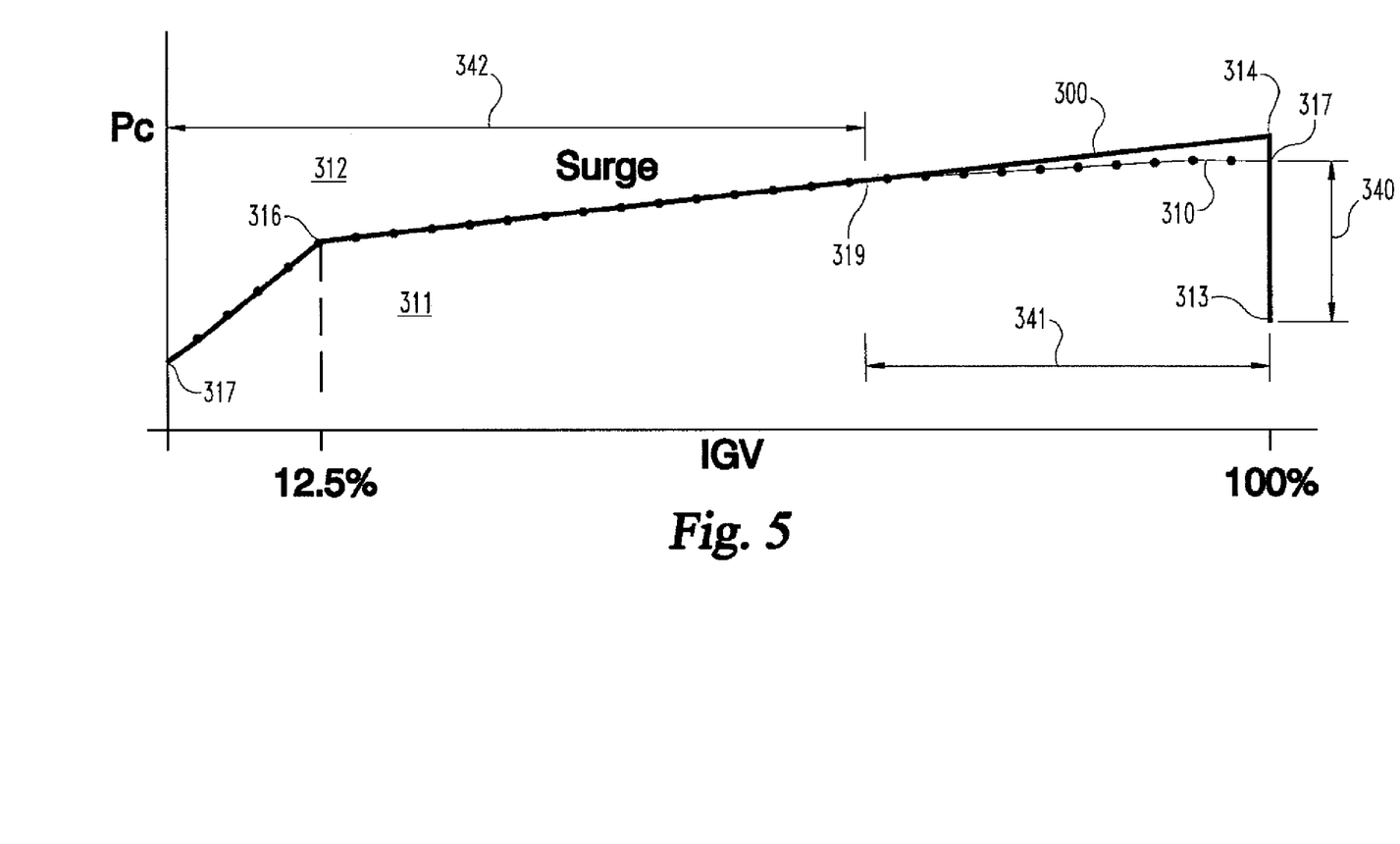
FIG. 5 is a graph of compressor pressure coefficient versus percent inlet guide vane opening illustrating a first control path.

With reference to FIG. 5 there is illustrated a graph similar to that of FIG. 3 but which further illustrates control line 310. Control line 310 follows surge control boundary 300 from point 313 to point 317 over range 340 where inlet guide position is maintained constant and compressor speed is varied. From point 317 to point 319, compressor speed and inlet guide vane both vary at a first rate. From point 319 to point 316, and from point 316 to point 317, compressor speed and inlet guide vane position both vary.

Figure 6:
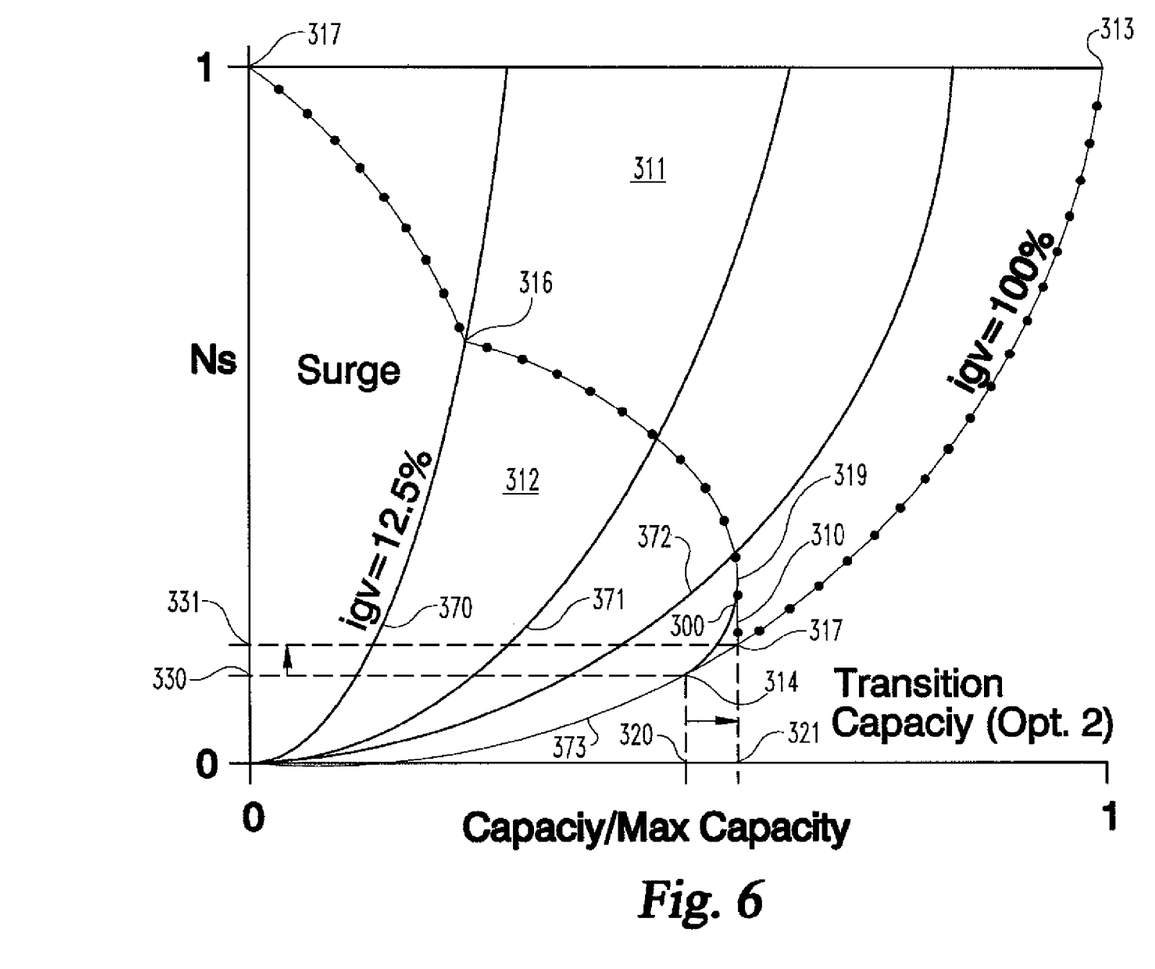
FIG. 6 is a graph of compressor speed versus the ratio of chiller capacity to maximum chiller capacity illustrating the first control path.

With reference to FIG. 6 there is illustrated a graph similar to that shown in FIG. 4 but further illustrating control line 310. As shown in FIG. 6, control line 310 follows surge control boundary 300 up to point 317 where it departs from the surge control boundary 300. Control line 310 extends from point 317 to point 319 where it rejoins surge control boundary 300. The inversion of the surge control boundary can be avoided by following control line 310. Thus, for example, control routine may determine a desired capacity, and from control line 310 determine a corresponding pair of speed and vane position values to enhance efficiency without compromising control stability. While conventional theory would predict that control line 310 compromises efficiency by departing from surge boundary 300, empirical testing of actual operation cycles has revealed that efficiency sacrifice, if any, is de minimis.

Figure 7:
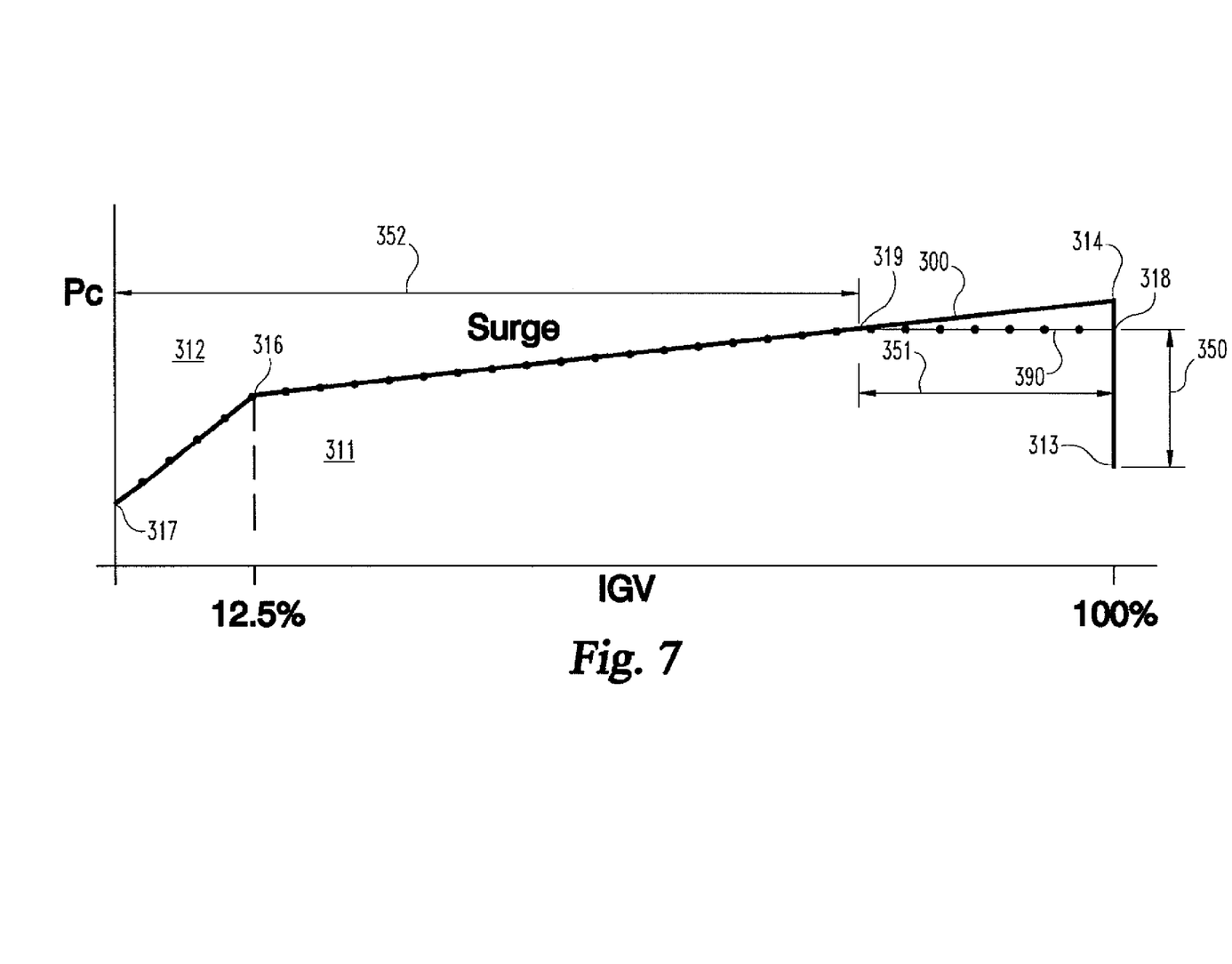
FIG. 7 is a graph of compressor pressure coefficient versus percent inlet guide vane opening illustrating a second control path.

With reference to FIG. 7 there is illustrated a graph similar to that of FIGS. 3 and 5 but illustrating a control line 390. From point 313 to point 318 control line 390 follows surge control boundary 300. From point 318 to point 319 control line 390 diverges from surge control boundary 300. From point 319 to point 316 and from point 316 to point 317 control line 390 again follows surge control boundary 300. Control line 390 defines three operating ranges 350, 351 and 352. For operating range 350 inlet guide vane position is constant at a maximum open position and compressor speed is varied. Over range 351, compressor speed is maintained constant and inlet guide vane position is varied. Over range 352, both compressor speed and inlet guide vane position are varied. Thus, starting at full load, the position of the inlet guide vanes will be at their maximum value. Initial unloading to control capacity is performed by reducing compressor speed with inlet guide vane position wide open. When the capacity command reaches a first transition point, compressor speed is held and constant capacity will be reduced by varying inlet guide vane position. When the capacity command is below a second transition point then both speed and vane position will be used to control capacity.

Figure 8:
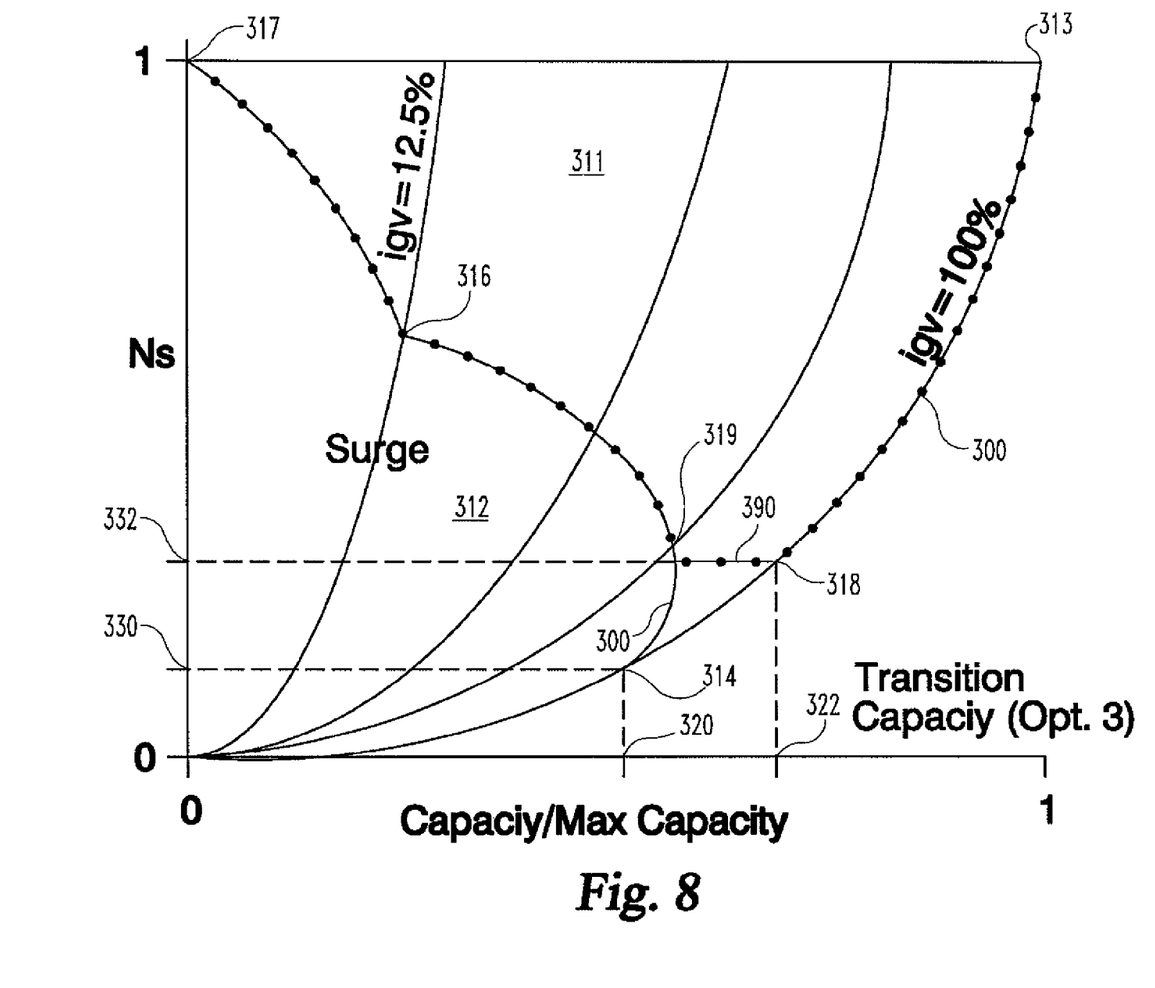
FIG. 8 is a graph of compressor speed versus the ratio of chiller capacity to maximum chiller capacity illustrating the second control path.

With reference to FIG. 8 there is illustrated a graph similar to that shown in FIGS. 4 and 6, but further illustrating control line 390. As illustrated in FIG. 8, control line 390 follows surge control boundary 300 from point 313 to point 318. From point 318 to point 319 control boundary 390 diverges from surge control boundary 300. From point 319 to point 316 and from point 316 to point 317, control boundary rejoins surge control boundary 300. The inversion of the surge control boundary can be avoided by following control line 390. Thus, for example, control routine may determine a desired capacity, and from control line 390 determine a corresponding pair of speed and vane position values to enhance efficiency without compromising control stability. While theory would predict that control line 390 compromises efficiency by departing from surge boundary 300, empirical testing of actual operation cycles has revealed that efficiency sacrifice, if any, is de minimis.

It is also possible to define other points at which a control line will diverge from a surge control boundary. These points could be located anywhere between point 317 and point 318 illustrated in FIGS. 6 and 8 and the corresponding line would intersect with inflection point 319. As with the control lines described above, theory would predict that each of these control lines would compromise efficiency by departing from surge boundary 300, but in practice that efficiency sacrifice, if any, is de minimis.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A chiller system comprising:
   a refrigeration loop including a centrifugal compressor, a condenser, and an evaporator;
   one or more variable inlet guide vanes positioned upstream of the compressor; a variable speed drive configured to drive the compressor;
   a controller configured to control the inlet guide vanes and the variable speed drive; and
   wherein the controller is configured to control chiller capacity along a control regulation path defined between a first capacity and a second capacity by varying compressor speed and varying vane position over a first chiller capacity range, maintaining compressor speed and varying vane position over a second capacity range greater than the first capacity range, and varying compressor speed and maintaining vane position over a third capacity range greater than the second capacity range.

2. The chiller system according to claim 1, wherein the controller comprises a capacity control module and an actuator control module, the capacity control module configured to receive system temperature information from one or more temperature sensors and output a capacity command, and the actuator control module configured to receive the capacity command and output a compressor speed command and a vane position command.

3. The chiller system according to claim 2, wherein the system temperature information comprises evaporator leaving water temperature information and evaporator entering water temperature information.

4. The chiller system according to claim 2, wherein values of the compressor speed command and vane position command correspond to a surge control boundary over the first capacity range and the third capacity range.

5. The chiller system according to claim 2, wherein the capacity command corresponds to a plurality of pairs of compressor speed and vane position values to provide a desired chiller capacity.

6. The chiller system according to claim 5, wherein the actuator control module is configured to select a particular pair of the plurality of pairs to provide a desired compressor efficiency.

7. The chiller system according to claim 2, wherein the actuator control module determines the compressor speed command and the vane position command based upon the capacity command, wherein the capacity command is based on evaporator leaving water temperature information, condenser entering water temperature information, evaporator refrigerant temperature or pressure information, and condenser refrigerant pressure information.

8. The chiller system according to claim 2, wherein the evaporator is configured to chill water.

9. A chiller system comprising:
   a refrigeration loop including a centrifugal compressor, a condenser, and an evaporator;
   one or more variable inlet guide vanes positioned upstream of the compressor; a variable speed drive configured to drive the compressor;
   a controller configured to control the inlet guide vanes and the variable speed drive; and
   wherein the controller is configured to control chiller capacity along a control regulation path defined between a first capacity and a second capacity by varying compressor speed and varying vane position over a first chiller capacity range, maintaining compressor speed and varying vane position over a second capacity range greater than the first capacity range, and varying compressor speed and maintaining vane position over a third capacity range greater than the second capacity range;

wherein a margin from a surge condition is increased over the second range as the variable inlet guide vanes are moved from a first position to a second position, the second position closer to a maximum open position of the variable inlet guide vanes than the first position.

10. The chiller system according to claim 9, wherein the controller comprises a capacity control module and an actuator control module, the capacity control module configured to receive system temperature information from one or more temperature sensors and output a capacity command, and the actuator control module configured to receive the capacity command and output a compressor speed command and a vane position command.

11. The chiller system according to claim 10, wherein the system temperature information comprises evaporator leaving water temperature information and evaporator entering water temperature information.

12. The chiller system according to claim 10, wherein values of the compressor speed command and vane position command correspond to a surge control boundary over the first capacity range and the third capacity range.

13. The chiller system according to claim 10, wherein the capacity command corresponds to a plurality of pairs of compressor speed and vane position values to provide a desired chiller capacity.

14. The chiller system according to claim 13, wherein the actuator control module is configured to select a particular pair of the plurality of pairs to provide a desired compressor efficiency.

15. The chiller system according to claim 10, wherein the actuator control module determines the compressor speed command and the vane position command based upon the capacity command, wherein the capacity command is based on evaporator leaving water temperature information, condenser entering water temperature information, evaporator refrigerant temperature or pressure information, and condenser refrigerant pressure information.

16. The chiller system according to claim 10, wherein the evaporator is configured to chill water.

* * * * *